US012181378B2

(12) United States Patent
Gorgievski et al.

(10) Patent No.: US 12,181,378 B2
(45) Date of Patent: Dec. 31, 2024

(54) ERROR CODE HISTORY COLLECTION WITH QUICK RESPONSE CODES

(71) Applicants: Alexander Gorgievski, North Canton, OH (US); Maranda Einstein, Grapevine, TX (US); Wonjun Jang, Fort Worth, TX (US); Thomas D. Ertle, Massillon, OH (US)

(72) Inventors: Alexander Gorgievski, North Canton, OH (US); Maranda Einstein, Grapevine, TX (US); Wonjun Jang, Fort Worth, TX (US); Thomas D. Ertle, Massillon, OH (US)

(73) Assignee: Nautilus Hyosung America, Inc., Irving, TX (US)

( * ) Notice: Subject to any disclaimer, the term of this patent is extended or adjusted under 35 U.S.C. 154(b) by 883 days.

(21) Appl. No.: 17/331,365

(22) Filed: May 26, 2021

(65) Prior Publication Data
US 2022/0381651 A1 Dec. 1, 2022

(51) Int. Cl.
*G06Q 20/00* (2012.01)
*G01M 99/00* (2011.01)
*G05B 23/02* (2006.01)
*G06K 7/10* (2006.01)
*G06Q 20/04* (2012.01)

(52) U.S. Cl.
CPC ....... *G01M 99/005* (2013.01); *G05B 23/0267* (2013.01); *G06K 7/10722* (2013.01); *G06Q 20/00* (2013.01); *G06Q 20/04* (2013.01)

(58) Field of Classification Search
CPC ............ G01M 99/005; G05B 23/0267; G06K 7/10722; G06Q 20/00; G06Q 20/04; G07F 19/209
See application file for complete search history.

(56) References Cited

U.S. PATENT DOCUMENTS

| 9,924,048 | B2 * | 3/2018 | Zakharov | H04N 1/00477 |
| 10,136,003 | B2 * | 11/2018 | Nakatsu | H04N 1/00076 |
| 2012/0303323 | A1 * | 11/2012 | Ha | D06F 34/32 |
| | | | | 702/183 |

(Continued)

OTHER PUBLICATIONS

QR codes for home repair and maintenance; https://web.archive.org/web/20210509111510/https://supercode.com/use-case/qr-codes-for-home-repair-and-maintenance (Year: 2021).*

*Primary Examiner* — Dennis W Ruhl
(74) *Attorney, Agent, or Firm* — Quinn IP Law

(57) ABSTRACT

A method for collecting error code history includes detecting a fault caused by errors in a machine, initiating a dispatch request from the machine to a service location, generating a first quick response code in response to a first input signal from a technician, where the first quick response code encodes first configuration items that describe the machine and first error codes that characterize the detected errors, presenting a first graphical image of the first quick response code on a display, performing a self-test in the machine in response to a second input signal, generating a second quick response code after the self-test has been completed, where the second quick response code encodes second configuration items that describe the machine and second error codes, and presenting a second graphical image of the second quick response code on the display.

20 Claims, 6 Drawing Sheets

(56) References Cited

U.S. PATENT DOCUMENTS

| | | | |
|---|---|---|---|
| 2013/0087608 A1* | 4/2013 | Addy | G06F 16/9554 235/375 |
| 2013/0114100 A1* | 5/2013 | Torii | H04N 1/00037 358/1.14 |
| 2016/0140429 A1* | 5/2016 | Glosser | G06K 19/06075 702/185 |
| 2019/0347532 A1* | 11/2019 | Amisar | G05B 15/02 |
| 2021/0029101 A1* | 1/2021 | Igari | G06K 7/1417 |

* cited by examiner

ERROR CODE HISTORY COLLECTION WITH QUICK RESPONSE CODES

INTRODUCTION

The present disclosure relates to a system and a method for collecting an error code history in a machine with quick response codes.

Some standalone machines lack network connections to service locations that are responsible for maintaining operations of the machines. As such, field service technical support departments have difficulty collecting error data from isolated machines when failures occur. A technician may be dispatched to a faulty machine. However, the technician may not have an electrical connection or backend software to transfer internal error codes automatically out of the faulty machine.

What is desired is a technique for collecting error code history in a machine with quick response codes.

SUMMARY

A method for collecting error code history is provided herein. The method includes detecting a fault caused by one or more errors in a machine, initiating a dispatch request from the machine to a service location in response to the fault, where the service location is distant from the machine, and generating a first quick response code in response to a first input signal received by the machine from a technician answering the dispatch request. The first quick response code encodes first data. The first data includes a plurality of first configuration items that describe the machine and one or more first error codes that characterize the one or more errors that were detected.

The method includes presenting a first graphical image of the first quick response code on a display of the machine, performing a self-test in the machine in response to a second input signal from the technician after a repairing of the machine is completed by the technician, and generating a second quick response code after the self-test has been completed. The second quick response code encodes second data. The second data includes a plurality of second configuration items that describe the machine and one or more second error codes that are valid after the repairing. The method includes presenting a second graphical image of the second quick response code on the display.

In one or more embodiments of the method, the machine is configured to communicate with a computer at the service location via a communication network, and the dispatch request is transferred from the machine to the computer via the communication network.

In one or more embodiments of the method, the first data includes one or more timestamps that indicate when the one or more errors occurred.

In one or more embodiments of the method, plurality of first configuration items includes one or more first software version numbers and one or more first hardware version numbers of electronics in the machine when the first input signal is received.

In one or more embodiments of the method, the plurality of second configuration items includes one or more second software version numbers and one or more second hardware version numbers of the electronics in the machine when the second input signal is received.

In one or more embodiments, the method includes storing the first data prior to the repairing, regenerating the first graphical image of the first quick response code after the repairing is completed, and redisplaying the first graphical image of the first quick response code after the repairing is completed.

In one or more embodiments, the method includes receiving the first graphical image of the first quick response code from the display at a camera of a mobile device associated with the technician, and parsing the first data in the first quick response code into a format readable and understandable by the technician. The format includes the plurality of first configuration items that describe the machine and the one or more first error codes. The method includes storing the first data in the mobile device, and repairing the machine in response to the first data.

In one or more embodiments, the method includes receiving the second graphical image of the second quick response code from the display at the camera of the mobile device. storing the second data in the mobile device, and transferring the first data and the second data to the service location.

In one or more embodiments of the method, the first data is transferred to the service location via a cellular network.

A machine is provided herein. The machine includes a display and a controller. The display is configured to present a first graphical image of a first quick response code, and a second graphical image of a second quick response code. The controller is in electronic communication with the display, and is configured to detect a fault caused by one or more errors in the machine, and initiate a dispatch request to a service location in response to the fault, where the service location is distant from the machine, and generate the first quick response code in response to a first input signal received from a technician answering the dispatch request. The first quick response code encodes first data. The first data includes a plurality of first configuration items that describe the machine and one or more first error codes that characterize the one or more errors that were detected. The controller is configured to perform a self-test in response to a second input signal received from the technician after a repair of the machine is completed by the technician, and generate the second quick response code after the self-test has been completed. The second quick response code encodes second data. The second data includes a plurality of second configuration items that describe the machine and one or more second error codes that are valid after the repair.

In one or more embodiments of the machine, the controller is further configured to communicate with an operator, and the dispatch request is transferred from the operator to the service location.

In one or more embodiments of the machine, the first data includes one or more timestamps that indicate when the one or more errors occurred.

In one or more embodiments of the machine, the plurality of first configuration items includes one or more first software version numbers and one or more first hardware version numbers of electronics in the machine when the first input signal is received.

In one or more embodiments of the machine, the plurality of second configuration items includes one or more second software version numbers and one or more second hardware version numbers of the electronics in the machine when the second input signal is received.

In one or more embodiments of the machine, the controller is further configured to store the first data prior to the repair, and regenerate the first quick response code after the repair is completed. The display is further configured to redisplay the first graphical image of the first quick response code after the repair is completed. The machine is an automatic teller machine.

A method for collecting error code history is provided herein. The method includes detecting a fault caused by one or more errors in a machine, initiating a dispatch request from the machine to a service location in response to the fault, where the service location is distant from the machine, and generating a first quick response code in response to a first input signal received by the machine from a technician answering the dispatch request. The first quick response code encodes first data. The first data includes a plurality of first configuration items that describe the machine and one or more first error codes that characterize the one or more errors that were detected.

The method includes presenting a first graphical image of the first quick response code on a display of the machine, receiving the first graphical image of the first quick response code from the display at a camera of a mobile device associated with the technician, and parsing the first data in the first quick response code into a format readable and understandable by the technician. The format includes the plurality of first configuration items that describe the machine and the one or more first error codes.

The method includes storing the first data in the mobile device, repairing the machine in response to the first data, performing a self-test in the machine in response to a second input signal from the technician after the repairing is completed by the technician, and generating a second quick response code after the self-test has been completed. The second quick response code encodes second data. The second data includes a plurality of second configuration items that describe the machine and one or more second error codes that are valid after the repairing.

The method includes presenting a second graphical image of the second quick response code on the display, receiving the second graphical image of the second quick response code from the display at the camera of the mobile device, and storing the second data in the mobile device.

In one or more embodiments, the method includes analyzing the first data external to the machine prior to starting the repairing.

In one or more embodiments, the method includes presenting one or more recommended actions to the technician in response to the analyzing. The repairing is based on the one or more recommended actions to fix the one or more first error codes.

In one or more embodiments, the method includes transferring the first data and the second data from the mobile device to a computer at the service location.

In one or more embodiments, the method includes entering an explanation of the repairing performed on the machine into the computer, and determining an effectiveness of the repairing of the machine by analyzing the first data, the second data, and the explanation using the computer.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide use of quick response (QR) codes as a mechanism for collecting error code history data that occur on machines in the field remotely. The QR codes allow field service technical support departments (e.g., technical help desks) to collect valuable historical error code data that happen at each site of each customer, without a connection or backend software implemented to process and/or transfer the data out of the machines.

Figure 1:
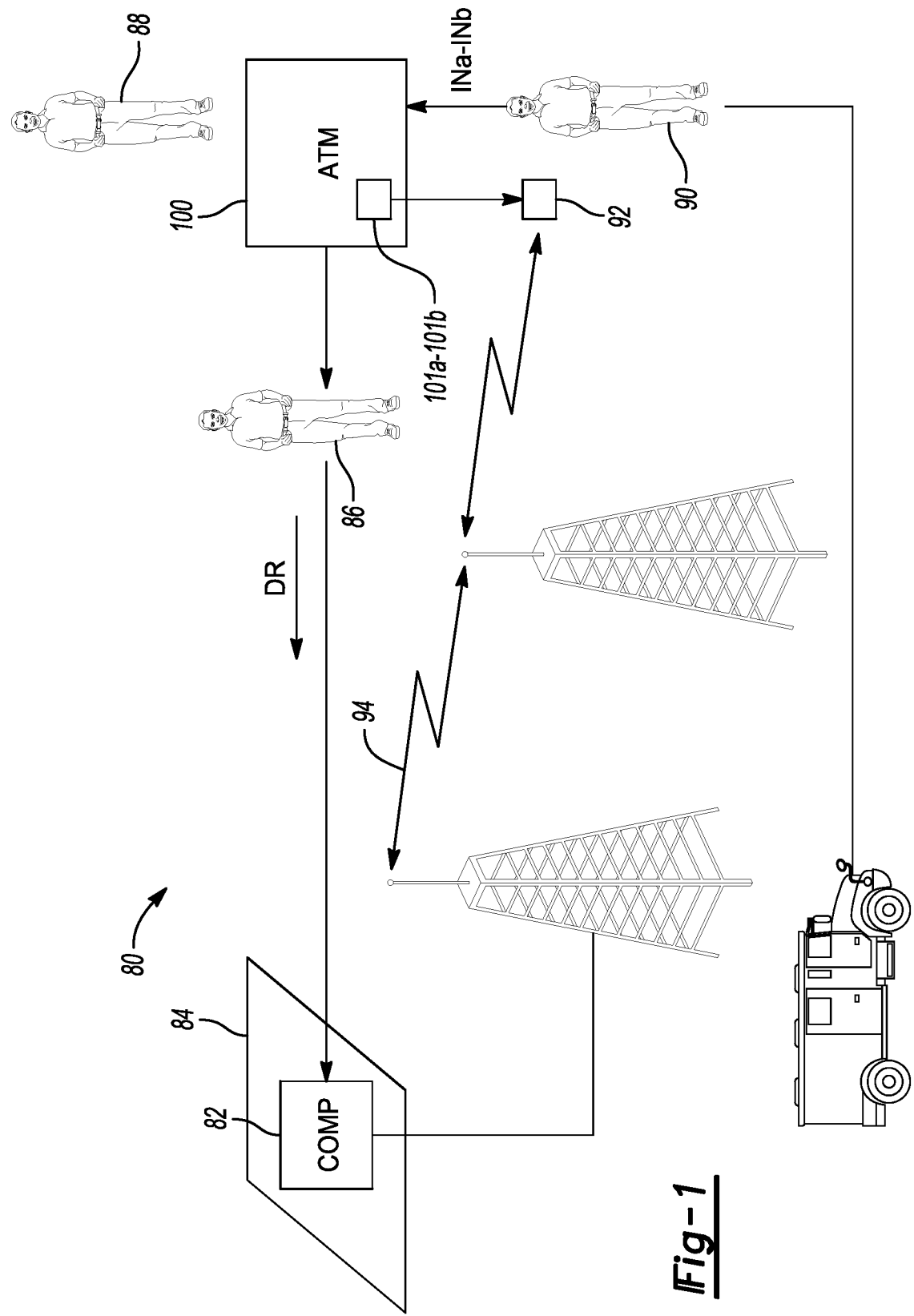
FIG. 1 is a schematic diagram illustrating a context of a system in accordance with one or more exemplary embodiments.

Referring to FIG. 1, a schematic diagram illustrating a context of a system 80 is shown in accordance with one or more exemplary embodiments. The system 80 generally includes a computer 82 at one or more service locations 84, one or more operators 86, multiple customers 88, one or more technicians 90, one or more mobile devices 92, a cellular network 94, and one or more machines 100. The system 80 implements QR code-based presentations of error codes to enable the technician 90 to record and read the error codes from the machine 100. The following explanation is made in terms of one each of the computer 82, the service location 84, the operator 86, the technician 90, the mobile device 92, and the machine 100. The machine 100 is implemented and described in terms of an automatic teller machine (ATM) 100.

The computer 82 implements one or more computers of a field service technical support department. The computer 82 is operational to receive the dispatch request signal (e.g., DR) from the operator 86. In response to receiving the dispatch request signal DR, the computer 82 may notify the technician 90 of the location of the failed automatic teller machine 100.

The computer 82 is also operational to receive and store error codes from the automatic teller machine 100 through the mobile device 92. The computer 82 may receive and store explanations of a repair implemented on the automatic teller machine 100 from the technician 90 through the mobile device 92. Based on the received data, the computer 82 analyzes the failures of the automatic teller machines 100 in response to the error codes present before and after the repair and the explanations, and determines how effective the repair was at resolving the particular error codes. Based on historical repairs of the same or similar error codes, the computer 82 may generate recommendations for a current repair and transmit the recommended actions to the technician 90 via the mobile device 92. The computer 82 may also send recommend solutions remotely to other sites that have similar issues. The historical data and recommended solutions generally enable the field service technical support departments to determine which automatic teller machines 100 have underlying issues that are not captured by the technician 90 while on site.

The service location 84 is one or more locations of the field service technical support department. The service location 84 generally houses the computer 82. The dispatch request signal DR may be received at the service location 84 in response to the automatic teller machine 100 experiencing one or more faults. The service location 84 may be located external to and distant from the automatic teller machine 100. For example, the service location 84 may be one or more miles away from the automatic teller machine 100, in a different city, or even in a different state than the automatic teller machine.

The operator 86 is a local person associated with the automatic teller machine 100. In some instances, the operator 86 may be an owner of the automatic teller machine 100. In other instances, the operator 86 may be an employee responsible for removing envelopes deposited into the machine, adding currency to the machine, and checking on a health of the automatic teller machine 100. When the automatic teller machine 100 indicates a fault (e.g., a warning message or a warning tone), the operator 86 sends the dispatch request signal DP to the service location 84. For example, the operator 86 may call the service location 84 via a telephone or cellular phone to report that the automatic teller machine 100 has a problem.

The customer 88 is a person authorized to utilize the automatic teller machine 100. The customer 88 generally has an account with one or more of dispense authorization parties. The customer 88 may perform a variety of banking operations using the automatic teller machine 100. The banking operations generally include, but are not limited to, withdrawal of cash, depositing checks, depositing cash, transferring funds between accounts, and checking account balances.

The technician 90 is a person authorized to perform service on the automatic teller machine 100. The technician 90 generally has access to an interior of the automatic teller machine 100 to perform repairs, perform maintenance operations, and/or perform setup operations.

The mobile device 92 implements a cellular telephone and/or a QR code scanner with cellular network capabilities. The mobile device 92 is carried by the technician 90 while the technician 90 is dispatched to a faulty automatic teller machine 100. The mobile device 92 is external to the automatic teller machine 100. The mobile device 92 includes a camera 96 (see FIG. 3), a memory 97 (see FIG. 3), and a mobile display 98 (see FIG. 4). The mobile device 92 is in bidirectional communication with the computer 82 via the cellular network 94. The camera 96 is operational to record the QR codes 101a-101b presented by the automatic teller machine 100. The memory 97 is operational to store error code data carried in the QR codes 101a-101b. The mobile device 92 is also operational to transfer the error code data to the computer 82 via the cellular network 94.

The mobile device 92 is operational to present information to the technician 90 via the mobile display 98. In various embodiments, the mobile device 92 is operational to receive recommended actions from the computer 82 and display the recommended actions to the technician 90 on the mobile display 98.

In some embodiments, the mobile device 92 is operational to capture configuration items of the automatic teller machine 100 and one or more error codes in the QR codes 101a-101b. Using the camera 96, the mobile device 92 may read graphical-image versions of the QR codes 101a-101b from a display of the automatic teller machine 100. The configuration items and error codes may be stored and displayed by the mobile device 92. In some embodiments, the mobile device 92 may also analyze the data parsed from the QR codes 101a-101b. The mobile device 92 subsequently generates recommended actions based on the internal analysis and/or the recommendations received from the computer 82. A program called "MoniAssist," available from Nautilus Hyosung America, Irvine, Texas, may be used to perform the analysis in the mobile device 92. Other programs may be implemented in the mobile device 92 to meet the design criteria of a particular application. Display of the data in the QR codes 101a-101b may include, but is not limited to, one or more timestamps, one or more hardware configuration numbers, one or more software configuration numbers, and zero or more error codes detected by the automatic teller machine 100.

The cellular network 94 implements one or more networks. The cellular network 94 is operational to provide bidirectional communications between the computer 82 and the mobile device 92. The bidirectional communications generally include the configuration items and the error codes of the automatic teller machine 100, recommended actions generated by the computer 82, and explanations of the repair made on the automatic teller machine 100, as created by the technician 90 using the mobile device 92. The cellular network 94 generally includes one or more wireless networks. In some situations, the cellular network 94 may include, but is not limited to, the Internet, wide area networks, local area networks, wired networks, optical networks, and radio-frequency networks. Other types of networks may be implemented to meet the design criteria of a particular application.

The automatic teller machine 100 implements an automated banking device that enables the customer 88 to access personal and/or business accounts at various times of the day. The automatic teller machine 100 generally runs background tests designed to detect errors, record times when the errors occurred, and, if possible, identify where in the circuitry of the automatic teller machine 100 that the errors happened. Software executing in the automatic teller machine 100 may create a list of error codes that characterize the errors detected by the background tests. The software also records the software versions and the hardware versions currently present in the automatic teller machine 100. In various embodiments, the machine 100 may alternatively be a self-serve kiosk, a vending machine, an information stand, or the like. Other types of machines 100 may be implemented to meet a design criteria of a particular application.

Upon detection of a fault, the automatic teller machine 100 may initiate a dispatch request to have the technician 90 repair the failed equipment. Initiation of the dispatch request may be achieved by displaying a visual message and/or generating an audio tone or message to alert the operator 86 to the problems. Since the automatic teller machine 100 may lack access to a communication network to contact the computer 82 directly, the operator 86 may relay the dispatch request to the service location 84 on behalf of the automatic teller machine 100.

Once on the site, the technician 90 answering the dispatch request may command the automatic teller machine 100 to report the error codes by entering a first input signal (e.g., INa). The automatic teller machine 100 may respond by generating a first QR code 101a. The first QR code 101a generally encodes first data available in the automatic teller machine 100. The first data includes first configuration items that describe the automatic teller machine 100 and one or more first error codes that characterize the one or more errors detected. The first data is subsequently presented to the technician 90 from a display of the automatic teller machine 100 as a first graphical image of the first QR code 101a.

After the technician 90 considers the recommended action, the technician 90 carries out an appropriate repair on the automatic teller machine 100. Once the repair is complete, a second input signal (e.g., INb) is entered into the automatic teller machine 100 by the technician 90. The automatic teller machine 100 responds to the second input signal INb by performing a self-test. Upon completion, a second QR code 101b is generated in response to the self-test. The second QR code 101b encodes second data. The second data includes second configuration items that describe the automatic teller machine 100 and zero or more second error codes that are valid after the repair. Since the repair may change the hardware and/or software inside the automatic teller machine 100, the second configuration items present after the repair may be different from the first configuration items present before the repair. In situations where the repair resolved each of the first error codes, zero second codes will remain afterwards. In other situations, some first error codes may remain active after the repair and/or new error codes may arise due to the repair.

After the self-test has finished, the automatic teller machine 100 presents a second graphical image of the second QR code 101b on the display to the technician 90. The technician 90 may subsequently record the second graphical image with the mobile device 92.

Figure 2:
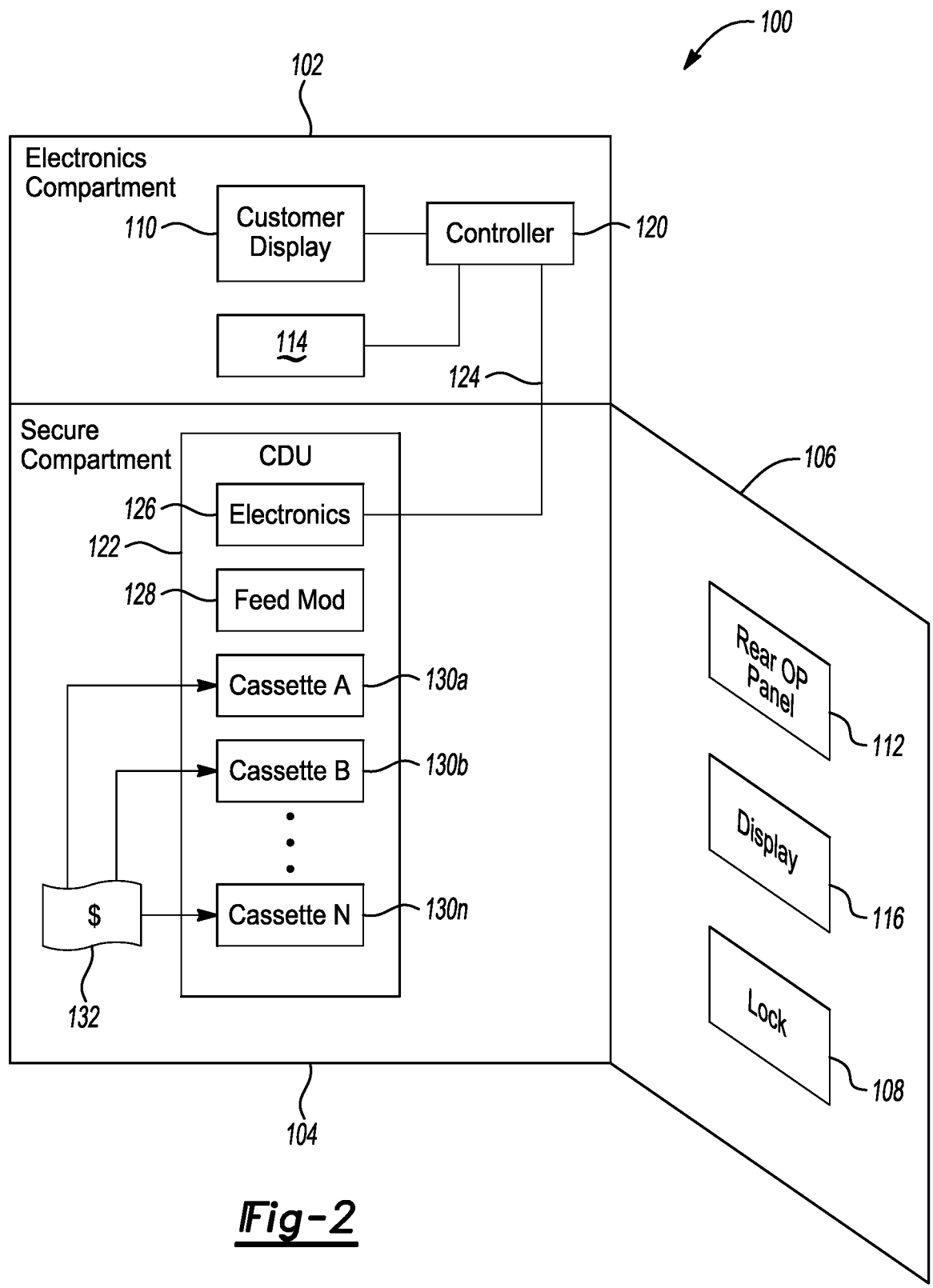
FIG. 2 is a perspective diagram of an automatic teller machine in accordance with one or more exemplary embodiments.

Referring to FIG. 2, a perspective diagram of an example implementation of the automatic teller machine 100 is shown in accordance with an exemplary embodiment. The automatic teller machine 100 generally includes an electronics compartment 102 and a secure compartment 104. A door 106 with a lock 108 prevents access to the secure compartment 104 from unauthorized people. The technician 90 is capable of opening the lock 108 on the door 106 to access an interior of the secure compartment 104.

The electronics compartment 102 houses a controller 120, a customer display 110, a rear operator panel 112, a card reader 114, and an optional rear display 116. Other electronics (or devices) may be housed in the electronics compartment 102. The controller 120 is configured to control the overall operations of the automatic teller machine 100. The controller 120 is in bidirectional communication with the dispense authorization parties via a communication network. The controller 120 is in bidirectional electronic communication with the electronics circuit 126 via a local communication bus 124. The controller 120 is also in bidirectional electronic communications with the read operator panel 112 and the read display 116.

The secure compartment 104 houses a cash dispenser unit 122 and a local communication bus 124. Other devices may be housed in the secure compartment 104. The cash dispenser unit 122 includes an electronics circuit 126, a feed module 128, and multiple cash cassettes 130a-130n. The cash cassettes 130a-130n are configured to hold currency 132.

The customer display 110 enables the customer 88 to enter banking transaction requests and provides visual and/or audio information to the customer 88. The rear operator panel 112 and the rear display 116 enable the technician 90 to perform maintenance and setup operations on the automatic teller machine 100 without accessing the electronics compartment 102 or the secure compartment 104. The card reader 114 is operational to read an electronic/magnetic banking card that partially verifies an identity of the customer 88. The rear display 116 is accessible by the technician 90 to receive the graphical images of the QR (quick response) codes 101a-101b. In some embodiments, the customer display 110 may be used to present the graphical images of the QR codes 101a-101b to the technician 90.

The controller 120 implements one or more computers. The controller 120 is operational to communicate with the dispense authorization parties via the communication network and the cash dispenser unit 122 via the local communication bus 124. The controller 120 is configured to interact with the customer 88 via the customer display 110 and the card reader 114. The controller 120 also interacts with the technician 90 via the rear operator panel 112, the rear display 116, and a variety of interfaces on a side of the controller 120.

The cash dispenser unit 122 implements a hardware-based device capable of executing financial transactions and conforms to protection protocols. The cash dispenser unit 122 is operational to store and dispense the currency 132 in response to commands received from the controller 120 via the local communication bus 124. The cash dispenser unit 122 is also operational to receive and store envelopes, cash, and checks deposited by the customer 88 into the automatic teller machine 100. Generally, the cash dispenser unit 122 may be a device capable of creating financial harm for the dispense authorization parties when used improperly or under malfunctioning conditions.

The local communication bus 124 implements a bidirectional electronic bus. The local communication bus 124 is operational to provide bidirectional command and data transfers between the controller 120 and the cash dispenser unit 122. In various embodiments, the local communication bus 124 may be a Universal Serial Bus, an RS-422 bus, or an Ethernet bus. Other types of buses may be implemented to meet the design criteria of a particular application.

The electronics circuit 126 implements local control of operations inside the cash dispenser unit 122. The electronics circuit 126 communicates bidirectionally with the controller 120 via the local communication bus 124. The electronics circuit 126 is operational to respond to commands from the controller 120 by validating the commands and subsequently acting on valid commands and rejecting invalid commands. The electronics circuit 126 provides a level of defense against attacks by participating in the protection protocol.

The feed module 128 is operational to dispense the currency 132 stored in the cash cassettes 130a-130n to the customer 88. The feed module 128 may also be operational to receive envelopes, cash, and checks from the customer 88 for storage inside the secure compartment 104.

The cash cassettes 130a-130n are operational to store the currency 132 loaded into the automatic teller machine 100. Under control of the electronics circuit 126, the cash cassettes 130a-130n may transfer the currency 132 to the feed module 128 for presentation to the customer 88.

Figure 3:
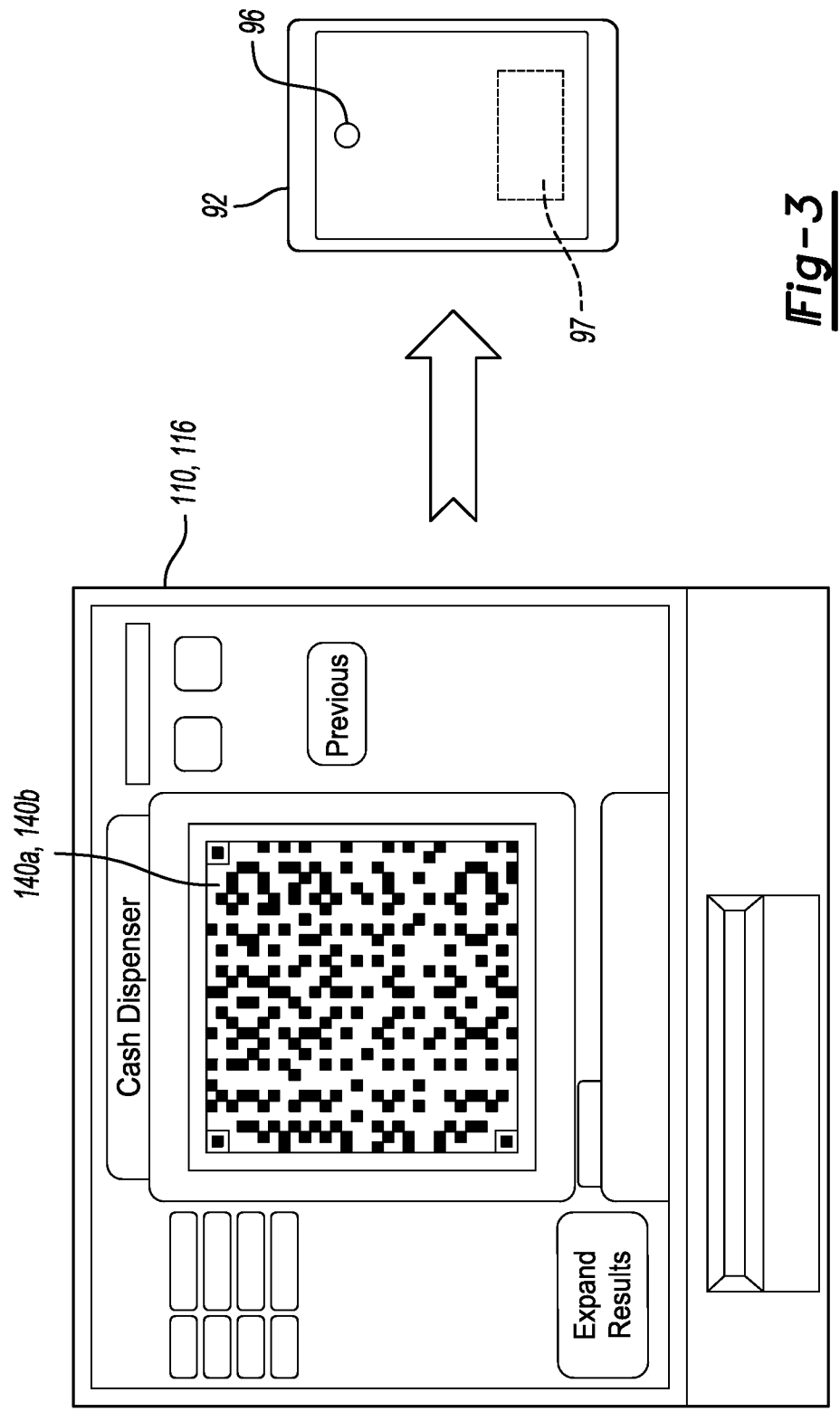
FIG. 3 is a schematic diagram of a transfer of graphical images of quick response codes to a mobile device in accordance with one or more exemplary embodiments.

Referring to FIG. 3, a schematic diagram of an example transfer of graphical images of the QR codes to the mobile device 92 is shown in accordance with one or more exemplary embodiments. The QR codes 101a-101b generally store the error codes and version information of the hardware and software of the automatic teller machine 100. The QR codes 101a-101b may be presented on a display of the automatic teller machine 100. The display that presents the graphical images of the QR codes 101a-101b may be the customer display 110 and/or the rear display 116.

The graphical images may include a first graphical image 140a of the first QR code 101a that encodes the first configuration items and the first error codes that triggered the dispatch request. The graphical images may also include a second graphical image 140b of the second QR code 101b that encodes the second configuration items and the second error codes the are active after the repair has been completed.

The first graphical image 140a, the second graphical image 140b, and optional subsequent graphical images, are transferred optically to the mobile device 92. The camera 96 of the mobile device 92 captures the graphical images 140a-140b. The mobile device 92 is configured to parse the data from the graphical images 140a-140b of the QR codes 101a-101b and store the data in the memory 97. The data may subsequently be transfer to the computer 82 and/or used in an on-site analysis of the error codes.

Figure 4:
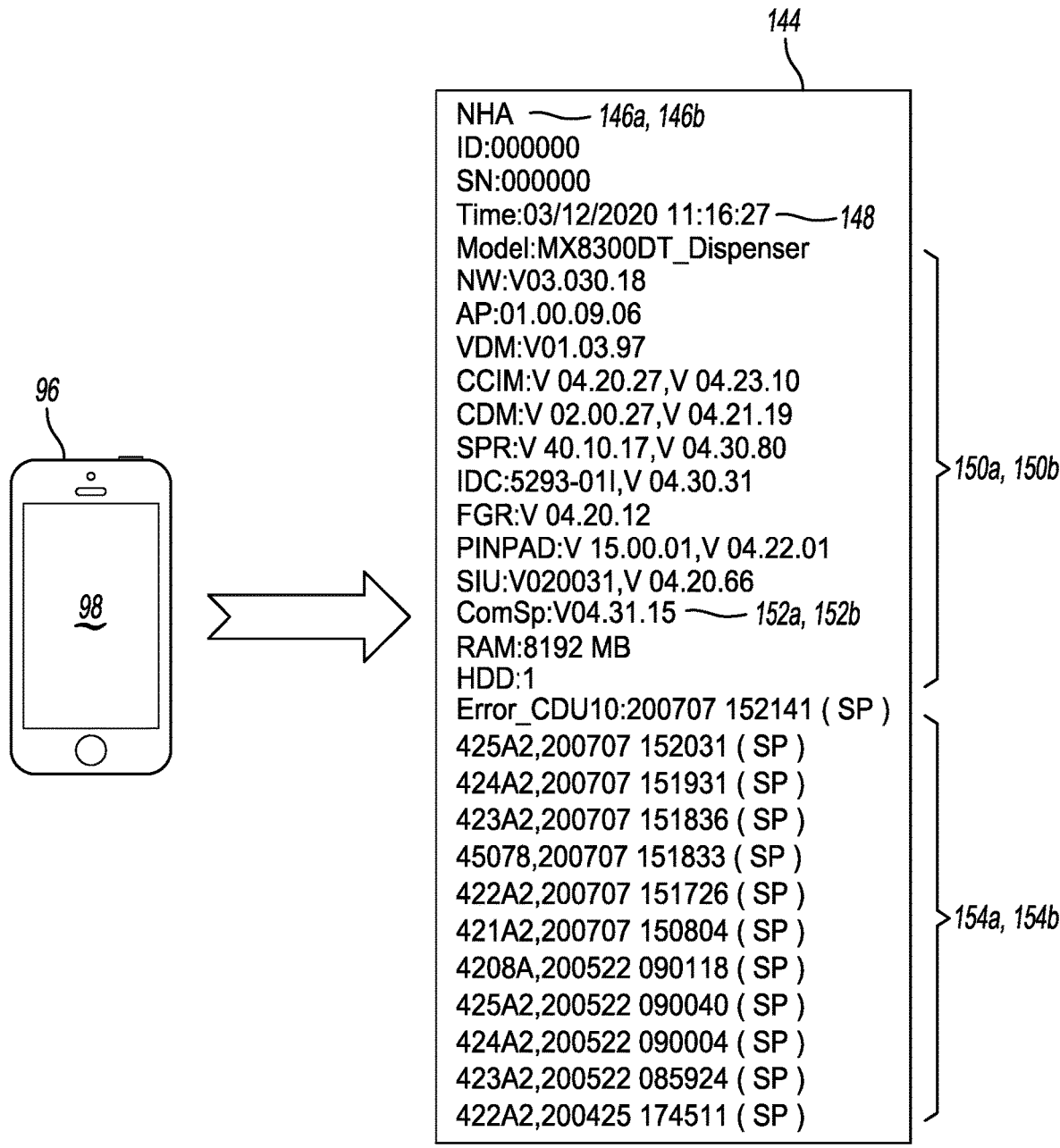
FIG. 4 is a schematic diagram of a display of configuration items and error codes by the mobile device in accordance with one or more exemplary embodiments.

Referring to FIG. 4, a schematic diagram of an example display of the configuration items and the error codes by the mobile device 92 is shown in accordance with one or more exemplary embodiments. After the mobile device 92 has parsed the data from the graphical images 140a-140b, the mobile device may arrange the data in a format 144, and display the formatted data to the technician 90 on the mobile display 98. The format 144 is designed to be readable and understandable by the technician 90. The format 144 may be applied to first data 146a decoded from the first QR code 101a, second data 146b decoded from the second QR code 101b, and subsequent data decoded from the subsequent QR codes. The format 144 generally includes a timestamp 148, multiple lines of first hardware version numbers 150a (pre-repair) or second hardware version numbers 150b (post-repair), one or more lines of first software version numbers 152a (pre-repair) or second software version numbers 152b (post repair), and the first error codes 154a (pre-repair) or the second error codes 154b (post-repair). In some situations, each error may have been fixed by the technician 90 and so the second data 146b may have zero second error codes 154b.

Figure 5:
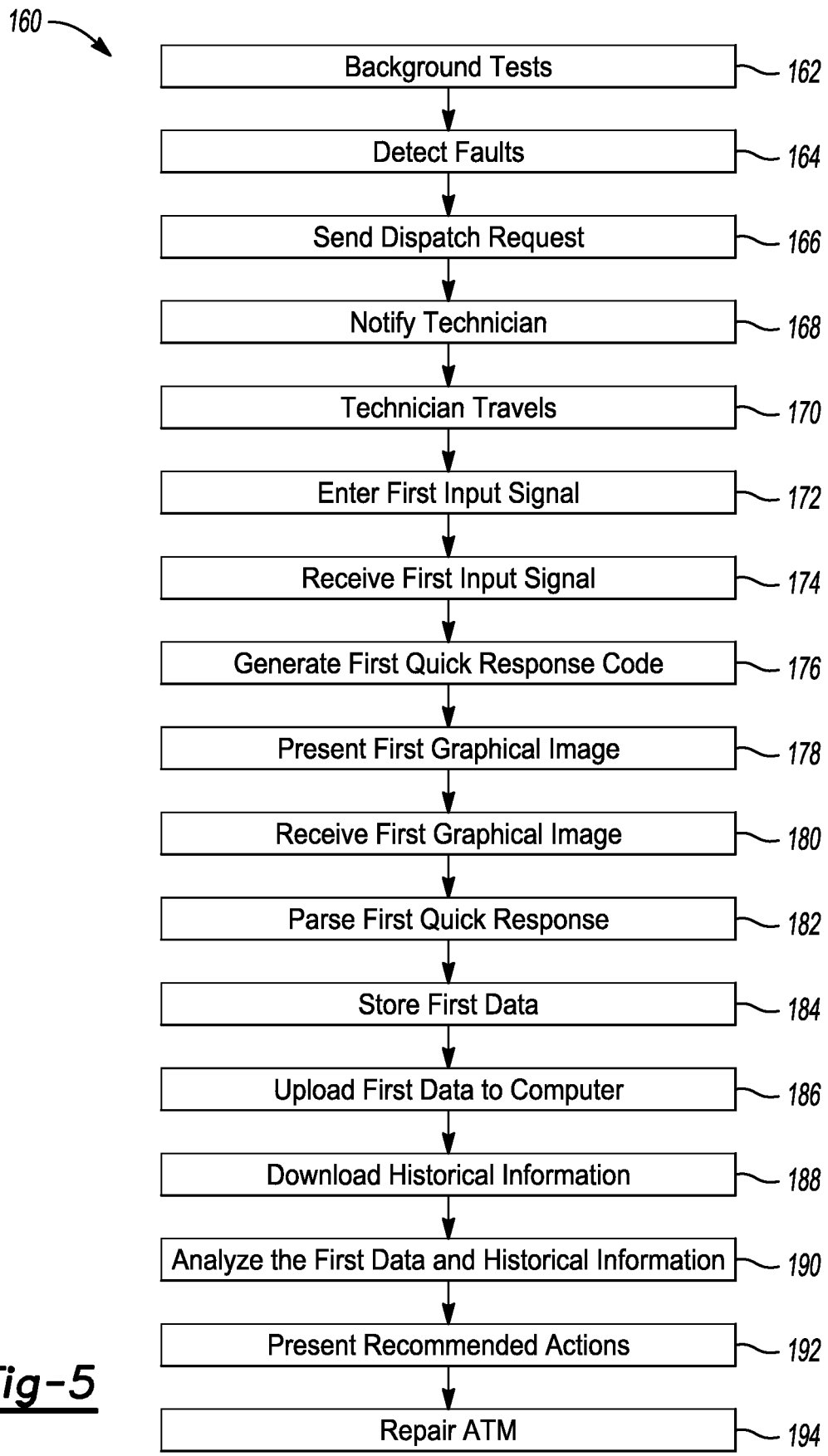
FIG. 5 is a flow diagram of a method for error code history recording in accordance with one or more exemplary embodiments.

Referring to FIG. 5, a flow diagram of an example method 160 for error code history recording is shown in accordance with one or more exemplary embodiments. The method (or process) 160 may be implemented by the system 80. The method 160 generally includes a step 162, a step 164, a step 166, a step 168, a step 170, a step 172, a step 174, a step 176, a step 178, a step 180, a step 182, a step 184, a step 186, a step 188, a step 190, a step 192, and a step 194. The sequence of steps is shown as a representative example. Other step orders may be implemented to meet the criteria of a particular application.

In the step 162, the automatic teller machine 100 may be running one or more background tests. The background tests are designed to detect faults, as indicated by the step 164. In response to detecting one or more faults, the automatic teller machine 100 initiates a dispatch request in the step 168 to the operator 86. The operator 86 notifies the technician 90 in the step 168 that the particular automatic teller machine 100 should be serviced.

In the step 170, the technician 90 answering the dispatch request travels to the site where the faulty automatic teller machine 100 is situated. If the first graphical image 140a is not already present on the customer display 110 and/or the rear display 116, the technician 90 may enter the first input signal INa into the automatic teller machine 100 in the step 172. The first input signal INa may be entered through a keypad on the customer-side of the automatic teller machine 100 and/or through the rear operator panel 112. Upon receiving the first input signal INa, the automatic teller machine 100 responds by generating the first QR code 101a in the step 176. In the step 178, the first graphical image 140a of the first QR code 101a is presented on one or both displays 110 and/or 116.

The technician 90 aims the camera 96 of the mobile device 92 at the display 110/116 so that the camera 96 scans the first graphical image 140a in the step 180. The mobile device 92 subsequently parses the first data 146a from the first graphical image 140a in the step 182, and stores the first data 146a in the memory 97 in the step 184. In various embodiments, the mobile device 92 uploads the first data 146a to the computer 82 via the cellular network 94 in the step 186. The computer 82 analyzes the first data 146a in light of historical data of previous error codes and previously successful repairs. If known solutions to the first error codes 154a are available, the historical information is downloaded from the computer 82 back to the mobile device 92 in the step 188.

In some situations, the mobile device 92 automatically analyzes the first data 146a and the historical information, where available, in the step 190 to determine one or more recommended actions to repair the automatic teller machine 100. The recommended actions are presented on the mobile display 98 to the technician 90 in the step 192. In other situations, the technician 90 performs a manual analysis of the first data 146a to determine a proper course of action to resolve the issues. The technician 90, armed with the recommendations, initiates the repair on the automatic teller machine 100 in the step 194.

Figure 6:
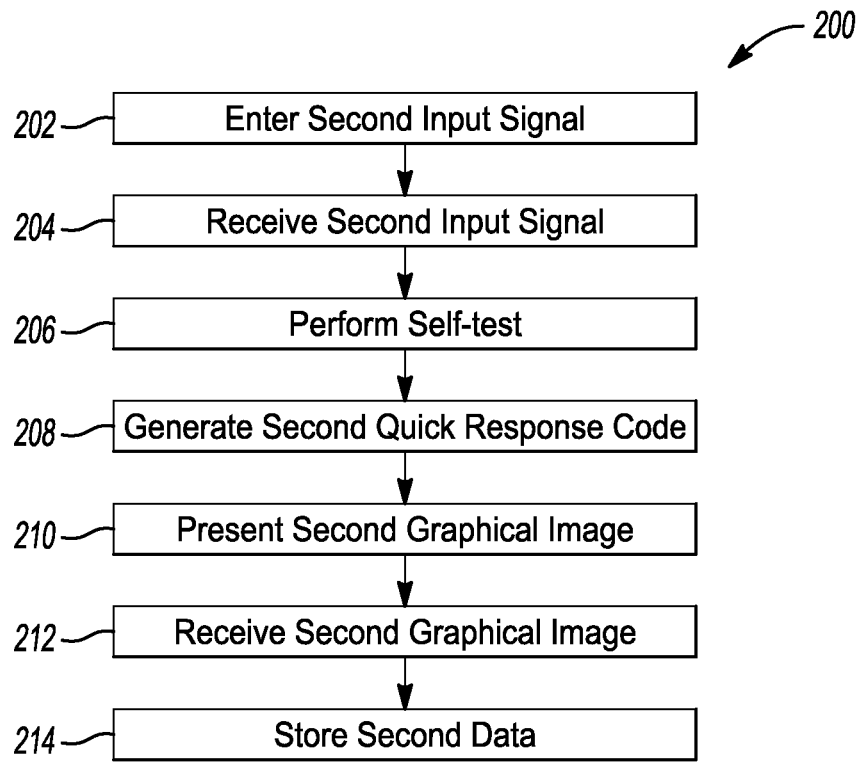
FIG. 6 is a flow diagram of a method for recording the repair results in accordance with one or more exemplary embodiments.

Referring to FIG. 6, a flow diagram of an example method 200 for recording the repair results is shown in accordance with one or more exemplary embodiments. The method (or process) 200 is implemented by the system 80. The method 200 generally includes a step 202, a step 204, a step 206, a step 208, a step 210, a step 212, and a step 214. The sequence of steps is shown as a representative example. Other step orders may be implemented to meet the criteria of a particular application.

In the step 202, the technician 90 enters the second input signal INb to the automatic teller machine 100 indicating that the repair has finished. In response to receiving the second input signal in the step 204, the automatic teller machine 100 performs a self-test in the step 206. When the self-test has finished, the automatic teller machine 100 generates the second QR code 101b in the step 208. In the step 210, the second graphical image 140b of the second QR code 101b is presented on one or both displays 110/116. The camera 96 receives the second graphical image 140b in the step 212. The second data 146b encoded in the image 140b is decoded and stored in the memory 97 in the step 214. The second data 146b may be used in responding to future tickets for the just-repaired automatic teller machine 100 and/or other automatic teller machines 100 that are experiencing similar problems.

In some situations, the technician 90 may go back and ask the automatic teller machine 100 to represent the first graphical image 140a another time. To recall the first QR code 101a, the technician 90 may re-enter the first input signal INa. In response to receiving the first input signal INa, the automatic teller machine 100 regenerates the first QR code 101a from data stored in local memory. The automatic teller machine 100 then redisplays the first graphical image 140a on one or both displays 110 and/or 116.

Figure 7:
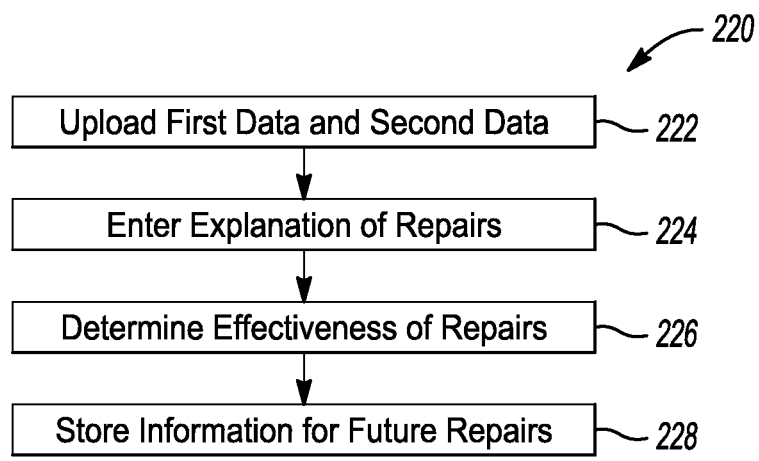
FIG. 7 is a flow diagram of a method for evaluating a repair in accordance with one or more exemplary embodiments.

Referring to FIG. 7, a flow diagram of an example method 220 for evaluating a repair is shown in accordance with one or more exemplary embodiments. The method (or process)

220 is implemented by the technician 90, the mobile device 92, and the computer 82. The method 220 generally includes a step 222, a step 224, a step 226, and a step 228. The sequence of steps is shown as a representative example. Other step orders may be implemented to meet the criteria of a particular application.

The mobile device 92 beings the method 220 by uploading the first data 146a and the second data 146b to the computer 82 in the step 222. The upload may be performed over the cellular network 94, or by a direct connection between the mobile device 92 and the computer 82 while the technician 90 is at the service location 84. In the step 224, an explanation of the repair tasks may be generated and loaded into the computer 82 by the technician 90. Generating the explanation may be performed using a keypad and/or a voice recognition application on the mobile device 92 and/or using a keyboard attached to the computer 82. The computer 82 may determine an effectiveness of the repair in the step 226 based on the changes in the second data 146b relative to the first data 146a, and the explanation provided by the technician 90. For example, the effectiveness may be a percentage of the first error codes 154a that were resolved as indicated by the second error codes 154b.

In the step 228, the computer 82 may store the information generated by the evaluation in memory for aiding future repairs (e.g., see step 188 in FIG. 5). An example program for processing and storing of the evaluation is called "ActiveLink," available from Nautilus Hyosung America, Irvine, Texas Other programs may be implemented to meet the design criteria of a particular application.

Embodiments of the present disclosure provide a technique suitable for various computer systems and/or other electronic devices to send useful device data over mobile phone networks rather than connecting directly to each terminal to collect the data. In some situations, issues may be resolved quickly and without significant physical review of the faulty machine. The technique generally enables field service technical support departments to get quick insights as to what is really happening on the site. Technicians may obtain quick, accurate recommended actions to perform while on the site based on the data recorded through the QR codes and/or historical data obtained from the computers at the service locations. The historical data provides opportunities for future problem solving data. Implementation of the QR codes reduces inaccurate data transfers and troubleshooting that may otherwise happen with verbal information passed in telephone calls and/or short notes passed in text messages from the operators/owners. In some situation, the technique also allows for performance evaluation opportunities of the technicians.

While the best modes for carrying out the disclosure have been described in detail, those familiar with the art to which this disclosure relates will recognize various alternative designs and embodiments for practicing the disclosure within the scope of the appended claims.

What is claimed is:

1. A method for collecting error code history comprising:
    performing a background test in a machine to detect a fault caused by one or more errors in the machine;
    initiating a dispatch request from the machine through an operator associated with the machine to a service location in response to the fault, wherein the service location is distant from the machine, and the machine is characterized by a lack of a connection to a communication network to transfer data to and from the service location;
    generating a first quick response code in response to a first input signal received by the machine from a technician answering the dispatch request, wherein the first quick response code encodes first data, and the first data includes a plurality of first configuration items that describe the machine and one or more first error codes that characterize the one or more errors that were detected;
    presenting a first graphical image of the first quick response code on a display of the machine;
    receiving the first data in the first quick response code in a mobile device brought to the machine by the technician;
    transferring the first data from the mobile device to the service location;
    generating one or more recommended actions at the service location to repair the machine based on the first data and historical repairs of the machine;
    transferring the one or more recommended actions from the service location to the mobile device;
    performing a self-test in the machine in response to a second input signal from the technician after a repairing of the machine is completed by the technician based on the one or more recommendations generated at the service location;
    generating a second quick response code after the self-test has been completed, wherein the second quick response code encodes second data, and the second data includes a plurality of second configuration items that describe the machine and one or more second error codes that are valid after the repairing;
    presenting a second graphical image of the second quick response code on the display;
    storing the first data prior to the repairing;
    regenerating the first graphical image of the first quick response code after the repairing is completed; and
    redisplaying the first graphical image of the first quick response code after the repairing is completed.

2. The method according to claim 1, wherein the machine is configured to communicate the service request to the operator via one or more of a visual message and an audio tone.

3. The method according to claim 1, wherein the first data includes one or more timestamps that indicate when the one or more errors occurred.

4. The method according to claim 1, wherein the plurality of first configuration items includes one or more first software version numbers and one or more first hardware version numbers of electronics in the machine when the first input signal is received.

5. The method according to claim 4, wherein the plurality of second configuration items includes one or more second software version numbers and one or more second hardware version numbers of the electronics in the machine when the second input signal is received.

6. The method according to claim 1, further comprising:
    parsing the first data in the first quick response code into a format readable and understandable by the technician with the mobile device, wherein the format includes the plurality of first configuration items that describe the machine and the one or more first error codes; and
    presenting the first data as parsed to the technician.

7. The method according to claim 6, further comprising:
    receiving the second graphical image of the second quick response code from the display at the mobile device;
    storing the second data in the mobile device; and transferring the first data and the second data to the service location.

8. The method according to claim 7, wherein the first data is transferred to the service location via a cellular network.

9. The method according to claim 1, wherein the machine is an automatic teller machine.

10. A machine comprising:
a display configured to present a first graphical image of a first quick response code, and a second graphical image of a second quick response code; and
a controller in electronic communication with the display, and configured to:
perform a background test in the machine to detect a fault caused by one or more errors in the machine;
initiate a dispatch request through an operator associated with the machine to a service location in response to the fault, wherein the service location is distant from the machine, and the machine is characterized by a lack of a connection to a communication network to transfer data to and from the service location;
generate the first quick response code in response to a first input signal received from a technician answering the dispatch request, wherein the first quick response code encodes first data, and the first data includes a plurality of first configuration items that describe the machine and one or more first error codes that characterize the one or more errors that were detected;
transfer the first data in the first quick response code through the display to a mobile device brought to the machine by the technician, wherein the mobile device transfers the first data to the service location, the service location generates one or more recommended actions to repair the machine based on the first data and historical repairs of the machine, and the service location transfers the one or more recommended actions to the mobile device;
perform a self-test in response to a second input signal received from the technician after a repair of the machine is completed by the technician based on the one or more recommendations generated at the service location;
generate the second quick response code after the self-test has been completed, wherein the second quick response code encodes second data, and the second data includes a plurality of second configuration items that describe the machine and one or more second error codes that are valid after the repair;
store the first data prior to the repair; and
regenerate the first quick response code after the repair is completed, wherein the display is further configured to redisplay the first graphical image of the first quick response code after the repair is completed.

11. The machine according to claim 10, wherein the controller is further configured to communicate the service request to the operator via one or more of a visual message and an audio tone.

12. The machine according to claim 10, wherein the first data includes one or more timestamps that indicate when the one or more errors occurred.

13. The machine according to claim 10, wherein the plurality of first configuration items includes one or more first software version numbers and one or more first hardware version numbers of electronics in the machine when the first input signal is received.

14. The machine according to claim 13, wherein the plurality of second configuration items includes one or more second software version numbers and one or more second hardware version numbers of the electronics in the machine when the second input signal is received.

15. The machine according to claim 10, wherein the machine is an automatic teller machine.

16. A method for collecting error code history comprising:
performing a background test in a machine to detect a fault caused by one or more errors in the machine;
initiating a dispatch request from the machine through an operator associated with the machine to a service location in response to the fault, wherein the service location is distant from the machine, and the machine is characterized by a lack of a connection to a communication network to transfer data to and from the service location;
generating a first quick response code in response to a first input signal received by the machine from a technician answering the dispatch request, wherein the first quick response code encodes first data, and the first data includes a plurality of first configuration items that describe the machine and one or more first error codes that characterize the one or more errors that were detected;
presenting a first graphical image of the first quick response code on a display of the machine;
receiving the first graphical image of the first quick response code from the display at a mobile device brought to the machine by the technician;
parsing the first data in the first quick response code into a format readable and understandable by the technician, wherein the format includes the plurality of first configuration items that describe the machine and the one or more first error codes;
storing the first data in the mobile device;
repairing the machine in response to the first data;
performing a self-test in the machine in response to a second input signal from the technician after the repairing is completed by the technician;
generating a second quick response code after the self-test has been completed, wherein the second quick response code encodes second data, and the second data includes a plurality of second configuration items that describe the machine and one or more second error codes that are valid after the repairing;
presenting a second graphical image of the second quick response code on the display;
receiving the second graphical image of the second quick response code from the display at the mobile device;
storing the second data in the mobile device;
transferring the first data and the second data from the mobile device to a computer at the service location;
generating one or more recommended actions in the computer to repair the machine based on the first data, the second data, and historical repairs of the machine; and
transferring the one or more recommended actions from the computer to the mobile device.

17. The method according to claim 16, further comprising:
analyzing the first data external to the machine prior to starting the repairing.

18. The method according to claim 17, further comprising:
presenting the one or more recommended actions to the technician from the mobile device, wherein the repairing is based on the one or more recommended actions to fix the one or more first error codes.

19. The method according to claim 16, further comprising:
  entering an explanation of the repairing performed on the machine into the computer; and
  determining an effectiveness of the repairing of the machine by analyzing the first data and the second data using the computer.

20. The method according to claim 16, wherein the machine is an automatic teller machine.

* * * * *